United States Patent
Seo (10) Patent No.: US 12,366,652 B2
(45) Date of Patent: Jul. 22, 2025

(54) APPARATUS AND METHOD FOR CONTROLLING RADAR IN VEHICLE

(71) Applicant: HL Klemove Corp., Incheon (KR)

(72) Inventor: JungGon Seo, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 471 days.

(21) Appl. No.: 17/938,933

(22) Filed: Sep. 7, 2022

(65) Prior Publication Data
US 2023/0076883 A1 Mar. 9, 2023

(30) Foreign Application Priority Data
Sep. 7, 2021 (KR) .......................... 10-2021-0118791

(51) Int. Cl.
*G01S 13/931* (2020.01)

(52) U.S. Cl.
CPC .................................. *G01S 13/931* (2013.01)

(58) Field of Classification Search
None
See application file for complete search history.

(56) References Cited

FOREIGN PATENT DOCUMENTS

KR 10-1739957 B1 5/2017

OTHER PUBLICATIONS

KR101739957 translation (Year: 2017).*
Office Action dated Oct. 29, 2024 for corresponding Korean Patent Application No. 10-2021-0118791, along with an English machine translation (12 pages).

* cited by examiner

*Primary Examiner* — Whitney Moore
(74) *Attorney, Agent, or Firm* — Hauptman Ham, LLP

(57) ABSTRACT

The present embodiments relates to an apparatus and a method for controlling a radar in a vehicle and, particularly, can provide an apparatus and a method for controlling a radar in a vehicle that correct a reception signal by determining a transmission correction coefficient using a reception coupling antenna for correcting transmission antennas, determining a reception correction coefficient by using a transmission coupling antenna for correcting reception antennas, and applying the determined correction coefficients.

12 Claims, 9 Drawing Sheets

APPARATUS AND METHOD FOR CONTROLLING RADAR IN VEHICLE

CROSS-REFERENCE TO RELATED APPLICATION

This application claims priority from Korean Patent Application No. 10-2021-0118791, filed on Sep. 7, 2021, which is hereby incorporated by reference for all purposes as if fully set forth herein.

BACKGROUND OF THE INVENTION

Field of the Invention

Embodiments relate to an apparatus and a method for controlling a radar in a vehicle.

Description of Related Art

Recently, radar devices are used in various fields, and, also in vehicles, radar devices are widely used as sensor devices for performing vehicle control. A radar device for a vehicle performs a function of extracting a position, speed information, or the like of a target object by transmitting radio waves having a predetermined frequency, receiving a signal reflected on the target object, and then processing the received signal. Target information acquired by such a radar device for a vehicle includes position information including distance information and angle information, a relative speed information between a host vehicle and a target, and the like. Various technologies such as a smart cruise technology for monitoring preceding vehicles using target information acquired by a radar device for a vehicle and traveling by automatically following a detected preceding vehicle, an autonomous traveling technology, and automatic emergency braking technology have been developed.

A radar device for a vehicle that is used for assisting autonomous traveling of the vehicle needs to provide a superior performance at a low cost even in complex road environments. Thus, in order for a radar device for a vehicle to acquire a superior performance, a radar device that is realized by arranging several transmission antennas and reception antennas may be used. In order to assure the performance of such a radar device, a method in which a fixed phase adjustment value in which element characteristics are reflected is set for each radar device, and a phase of a transmission signal is corrected has been proposed.

However, for a radar device for a vehicle, element characteristics of the mounted radar device may change in accordance with an external shock or external environments during traveling. Such error may case a failure in measurement of distances to a vehicle and an obstacle present ahead, which may lead a fatal accident during traveling. In a conventional method in which a fixed phase adjustment value is used, error according to a change in element characteristics is unable to be reflected. Thus, a way for enabling a radar device for a vehicle to periodically correct error according to changes in element characteristics caused by an external shock or external environments is necessary.

SUMMARY OF THE INVENTION

In such a background, these embodiments provide an apparatus and a method for controlling a radar in a vehicle that correct a reception signal using a correction coefficient that is periodically determined.

According to one aspect, these embodiments can provide a radar control apparatus of a vehicle including: a transmitter/receiver that transmits transmission signals having respective waveforms from a plurality of transmission antennas and a transmission coupling antenna at a period set in advance and receives the transmission signals using a reception coupling antenna and a plurality of reception antennas; and a signal processor that determines a correction coefficient based on phases acquired from received signals and corrects the reception signals received by the reception antennas using the correction coefficient.

According to another aspect, these embodiments can provide a radar control method of a vehicle including: transmitting transmission signals having respective waveforms from a plurality of transmission antennas and a transmission coupling antenna at a period set in advance and receiving the transmission signals using a reception coupling antenna and a plurality of reception antennas; and determining a correction coefficient based on phases acquired from received signals and correcting the reception signals received by the reception antennas using the correction coefficient.

According to these embodiments, an apparatus and a method for controlling a radar in a vehicle that correct a reception signal using a correction coefficient that is periodically determined can be provided.

DETAILED DESCRIPTION OF THE INVENTION

The present disclosure relates to an apparatus and a method for controlling a radar in a vehicle.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
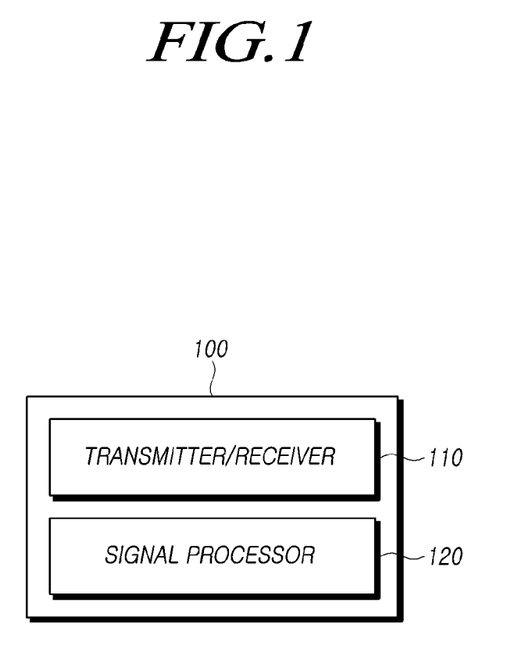
FIG. 1 is a diagram illustrating a configuration of a radar control apparatus of a vehicle according to an embodiment of the present disclosure.

FIG. 1 is a diagram illustrating a configuration of a radar control apparatus of a vehicle according to an embodiment of the present disclosure.

Referring to FIG. 1, the radar control apparatus (100) of a vehicle according to an embodiment of the present disclosure may include: a transmitter/receiver (110) that transmits transmission signals having respective waveforms from a plurality of transmission antennas and transmission coupling antennas at a period set in advance and receives the signals using a reception coupling antenna and a plurality of reception antennas; and a signal processor (120) that determines correction coefficients based on phases acquired from the received signals and corrects reception signals received by the reception antennas using the determined correction coefficients.

According to one embodiment, the transmitter/receiver (110) may use a plurality of transmission antennas transmitting transmission signals to the vicinity of a vehicle and a plurality of reception antennas receiving reception signals reflected on objects. Such transmission antennas or reception antennas may be configured as a plurality of array antennas spaced apart by a predetermined distance in a horizontal direction. The transmission antennas may be controlled to transmit transmission signals of a specific operating frequency band, and the reception antennas may be controlled to receive reception signals. The transmitter/receiver (110) may install and use a reception coupling antenna and a transmission coupling antenna for correcting the transmission antennas and the reception antennas. As a specific example, the transmitter/receiver (110) may include a voltage-controlled oscillator (VCO) that generates transmission signals by supplying signals to the plurality of transmission antennas and the transmission coupling antenna, an oscillator, and the like. In addition, the transmitted/receiver (110) may further include a phase shifter and a coupler disposed in a path between each transmission antenna and a signal processor (120). As another example, the transmitter/receiver (110) may include: a low noise amplifier (LNA) that amplifies a reflection signal received through the reception coupling antenna or the plurality of reception antennas with low noise; a mixer that mixes reception signals that have been amplified with low noise; an amplifier that amplifies the mixed reception signal; an analog digital converter (ADC) that generates reception data by converting the amplified reception signal into a digital signal, and the like.

As another embodiment, the transmitter/receiver (110) may transmit transmission signals having respective waveforms from a plurality of transmission antennas and a transmission coupling antenna at a period set in advance and receive signals using a reception coupling antenna and a plurality of reception antennas. Here, the reception coupling antenna is an antenna that is additionally connected for correcting the plurality of transmission antennas and may be an antenna having coupling with the transmission antennas. In addition, the transmission coupling antenna is an antenna that is additionally connected for correcting the plurality of reception antennas and may be an antenna having coupling with the reception antennas. As one example, the transmitter/receiver (110) may receive transmission signals transmitted from transmission channels of the transmission antennas using the reception coupling antenna connected to the transmission antennas. For example, the transmitter/receiver (110) may transmit transmission signals from A transmission antennas and receive the transmission signals through one reception coupling antenna connected to the A transmission antennas.

As one example, the transmitter/receiver (110) may receive transmission signals transmitted from the transmission coupling antenna connected to the reception antennas in reception channels of the reception antennas. For example, the transmitter/receiver (110) may transmit a transmission signal from one transmission coupling antenna connected to B reception antennas and receive the transmission signal through the B reception antennas. At this time, the transmission signal is a signal output from one transmission coupling antenna and may be received to be the same by the B reception antennas. Here, A and B may be natural numbers.

In addition, the transmitter/receiver (110) may transmit transmission signals transmitted from a plurality of transmission antennas as transmission signals of the same waveform or transmission signals of different waveforms. Here, transmission signals transmitted from the plurality of transmission antennas and a transmission signal transmitted from the transmission coupling antenna need to be distinguished from each other, and thus the transmitter/receiver (110) may transmit the transmission signals as transmission signals of mutually-different waveforms.

As another embodiment, the transmitter/receiver (110) may transmit transmission correction signals based on a transmission signal set. As one example, the transmitter/receiver (110) may determine transmission signals transmitted from transmission channels of the transmission antennas and a transmission signal transmitted from the transmission coupling antenna as one transmission signal set. For example, the transmitter/receiver (110) may determine one transmission signal set by combining transmission signals of mutually-different waveforms each transmitted for each transmission channel of the transmission antenna and one transmission signal transmitted from the transmission coupling antenna. Thus, the transmitter/receiver (110) may determine one transmission signal set acquired by combining transmission signals corresponding to the number of transmission antennas and one transmission signal generated from the transmission coupling antenna. More specifically, the transmission signal set may be composed of transmission signals in the form of a chirp sequence (CS), and transmission signals in the form of the chirp sequence may be configured as several linear frequency modulated continuous wave (LFMCW) chirp signals. Thus, the transmission signal set may be a combination of transmission signals each being in the form of a chirp sequence, or transmission signals may be generated to have mutually-different waveforms by differently setting time durations of chirp signals and bandwidths of the chirp signals. Here, the transmission signal may be signal in various forms other than the chirp sequence forms and are not limited thereto.

As another example, the transmitter/receiver (110) may transmit a transmission correction signal based on the determined transmission signal set. For example, the transmitter/receiver (110) may transmit a transmission correction signal generated by repeating the determined transmission signal set an arbitrary number of times for each period. As a more specific example, the transmitter/receiver (110) may transmit a transmission correction signal with a specific period for correcting a phase based on a signal processing period of the radar device. At this time, the transmitter/receiver (110) may use one transmission signal set that has been determined as a transmission correction signal. Alternatively, the transmitter/receiver (110) may generate a transmission correction signal in which the determined transmission signal set is repeated an arbitrary number of times and transmit the generated transmission correction signal. In such a case, the phase may be determined as a value acquired by averaging acquired phases corresponding to the arbitrary number of times repeated in the transmission correction signal. Thus, by configuring the transmission correction signal in which the transmission signal set is repeated, the transmitter/receiver (110) can acquire a more accurate phase. Here, the transmission correction signal may be a signal different from a transmission signal used for detecting a target by a radar as a transmission signal dedicatedly used for correcting a phase of a reception signal.

According to one embodiment, the signal processor (120) may determine information (a position, a distance, an angle, and the like) of a target using a reflection signal and a transmission signal received by a reception antenna. Such a signal processor (120) may be represented using a different term such as a controller and may be implemented in the form of a digital signal processor (DSP). For example, the signal processor (120) may acquire a phase of a transmission/reception signal if target information is acquired through processing of a transmission signal and a reception signal. As a more specific example, the signal processor (120) may acquire transmission data and reception data and perform frequency conversion by controlling generation of a transmission signal based on the acquired transmission data and synchronizing the transmission data and the reception data with each other. Then, the signal processor (120) may perform constant false alarm rate (CFAR) determination, tracking determination, target selection determination, and the like based on the frequency-converted reception data and extract angle information, speed information, and distance information for a target. However, the configuration is not limited thereto, and a technical ideal according to the present disclosure may be applied in a case where information for a target can be extracted. In addition to the information for a target, the signal processor (120) may acquire a minute difference occurring in the phase of a transmission signal in a transmission channel or the phase of a reception signal in a reception channel in accordance with a dynamic environment change of the radar device using a transmission correction signal.

According to another embodiment, the signal processor (120) may determine a correction coefficient based on a phase acquired from a signal received in accordance with transmission of a transmission correction signal. As one example, the signal processor (120) may acquire a phase for each transmission channel in a reception channel port of the reception coupling antenna and determine a reciprocal of the acquired phase as a transmission correction coefficient. For example, the signal processor (120) may acquire a phase corresponding to each transmission antenna based on a transmission signal transmitted in a transmission channel of each transmission antenna at a first transmission time point and a reception signal received in a reception channel port of the reception coupling antenna. Then, the signal processor (120) may determine a reciprocal of the acquired phase for each transmission channel of each transmission antenna as a transmission correction coefficient for each transmission channel of each transmission antenna.

As another example, the signal processor (120) may acquire a phase for each reception channel from the reception antenna using the transmission channel port of the transmission coupling antenna and determine a reciprocal of the acquired phase as a transmission correction coefficient. For example, the signal processor (120) may acquire a phase corresponding to each reception antenna based on a transmission signal transmitted in the transmission channel port of the transmission coupling antenna at a first transmission time point and a reception signal received in the reception channel of each reception antenna. Then, the signal processor (120) may determine a reciprocal of the acquired phase for each reception channel of each reception antenna as a reception correction coefficient for each reception channel of each reception antenna.

According to another embodiment, the signal processor (120) may correct a reception signal received by the reception antenna using the determined correction coefficient. As one example, the signal processor (120) may determine a correction coefficient by multiplying a transmission correction coefficient by a reception correction coefficient and update the correction coefficient based on a period set in advance. In addition, the signal processor (120) may perform a function of correcting a phase of a reception signal at a next time point using the determined correction coefficient. For example, the signal processor (120) may correct a phase of a reception signal until a following second transmission time point using the determined correction coefficient. Here, the second transmission time point is a time point at which a transmission correction signal is transmitted after the first transmission time point, and an interval between the first transmission time point and the second transmission time point may be a period set in advance.

More specifically, the radar control apparatus of a vehicle according this embodiment may use a MIMO antenna system for realizing detection accuracy or resolution of a radar sensor. In the MIMO antenna system, the transmission antennas may transmit signals having independent waveforms that can be distinguished from each other. In other words, each transmission antenna may transmit a signal having an independent waveform that can be distinguished from those of other transmission antennas, and each reception antenna may determine which transmission antenna has transmitted a reflection signal reflected on an object in accordance with different waveforms of these signals.

Thus, by applying the determined correction coefficients to the MIMO antenna, the radar control apparatus of a vehicle can reflect changes in the characteristics of elements in real time. In addition, effects of the accuracy of the MIMO antenna system being raised and a performance change being improved can be provided.

Figure 2:
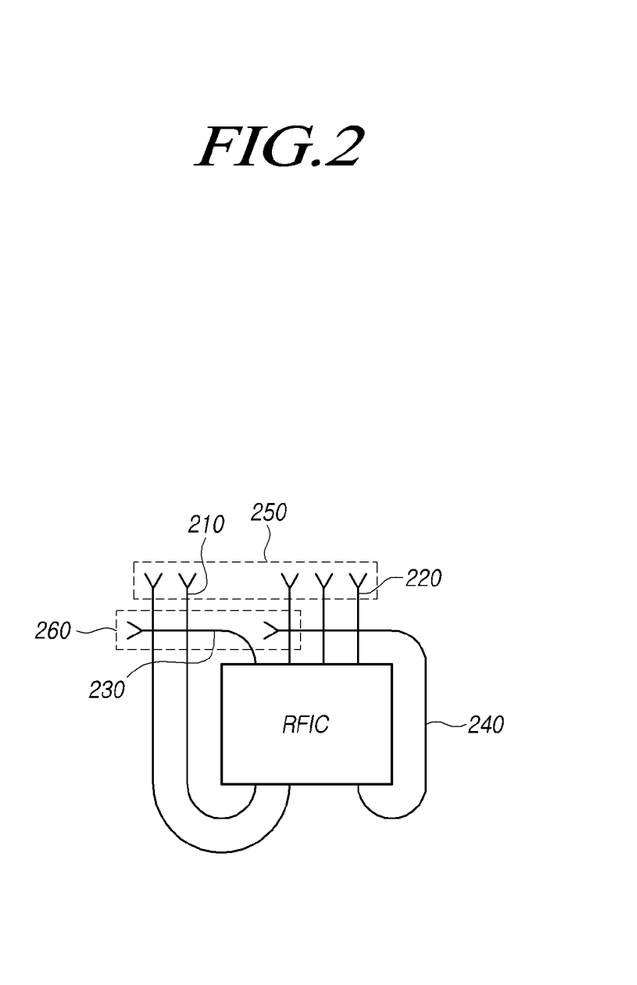
FIG. 2 is a diagram illustrating antennas of a radar control apparatus of a vehicle according to an embodiment of the present disclosure.

FIG. 2 is a diagram illustrating antennas of a radar control apparatus of a vehicle according to an embodiment of the present disclosure.

Referring to FIG. 2, a radio frequency (RF) module including antennas used for the radar control apparatus of a vehicle to perform phase correction in real time can be described. According to one embodiment, the transmitter/receiver (110) may transmit transmission signals through transmission channels of a plurality of transmission antennas (210), and reception signals reflected on a target may be received through a plurality of reception antennas (220). For example, the transmitter/receiver (110) may control transmission of transmission signals using a plurality of transmission antennas (210) Tx1, Tx2, . . . , TxA. A path along which each transmission antenna (210) transmits a transmission signal may be defined as a transmission channel. The transmitter/receiver (110) may control reception of reception signals using a plurality of reception antennas (220) Rx1, Rx2, . . . , RxB. A path along which each reception antenna (220) receives a reception signal may be defined as a reception channel. For example, the transmitter/receiver (110) may transmit the same transmission signal in multiple transmission channels at the same time point. At this time, in order to improve reception signal quality and accurate target information acquisition, the transmission signals may have the same phase. However, minute differences in phases of transmission signals transmitted in a plurality of transmission channels may occur for each transmission time point in accordance with changes in temperatures, physical characteristics, and the like of elements configuring the radar device due to external environments and external shocks. Thus, in this embodiment, in order to respond to changes in the environment of antennas, a way for periodically correcting phase values of signals by additionally connecting a reception coupling antenna (230) and a transmission coupling antenna (240) is proposed. At this time, an antenna is a waveguide antenna (WG) capable of coupling transmission/reception antennas, and a phase value of a signal can be corrected in real time through this. More specifically, the waveguide antenna is an antenna in the form of a waveguide and may have a shape in which an end of the waveguide is open in a rectangular shape or a circular shape. The waveguide antenna is a high efficiency/high gain antenna having a small power feed loss at a high frequency and enables a decrease in size and a decrease in the thickness and can maintain stability of the antenna at the time of movement.

According to another embodiment, in order to correct a plurality of transmission antennas (210) and a plurality of reception antennas (220), the transmitter/receiver (110) may transmit and receive a transmission correction signal by connecting the reception coupling antenna (230) and the transmission coupling antenna (240). For example, the reception coupling antenna (230) is used for correcting the plurality of transmission antennas (210) and may receive a transmission signal transmitted from each of the transmission antennas (210) and perform signal processing. In addition, the transmission coupling antenna (240) is used for correcting the plurality of reception antennas (220) and may receive a transmission signal transmitted from the transmission coupling antenna (240) using each of the reception antennas (220) and perform signal processing. Here, transmission signals transmitted for correction by the plurality of transmission antennas (210) and the transmission coupling antenna (240) may be transmission correction signals.

As another example, the reception coupling antenna (230) may be installed at a position near the transmission antennas (210), and the transmission coupling antenna (240) may be installed at a position near the reception antennas (220). As a more specific example, if the plurality of transmission antennas (210) and the plurality of reception antennas (220) are installed in an (N+1)-th layer (250) in a PCB of an RF module, the reception coupling antenna (230) and the transmission coupling antenna (240) may be installed in an N-th layer (260). The transmitter/receiver (110) may transmit and receive a transmission correction signal with a period set in advance. Here, a transmission period of a transmission correction signal may be set in consideration of an overhead in accordance with the performance of the radar device.

Figure 3:
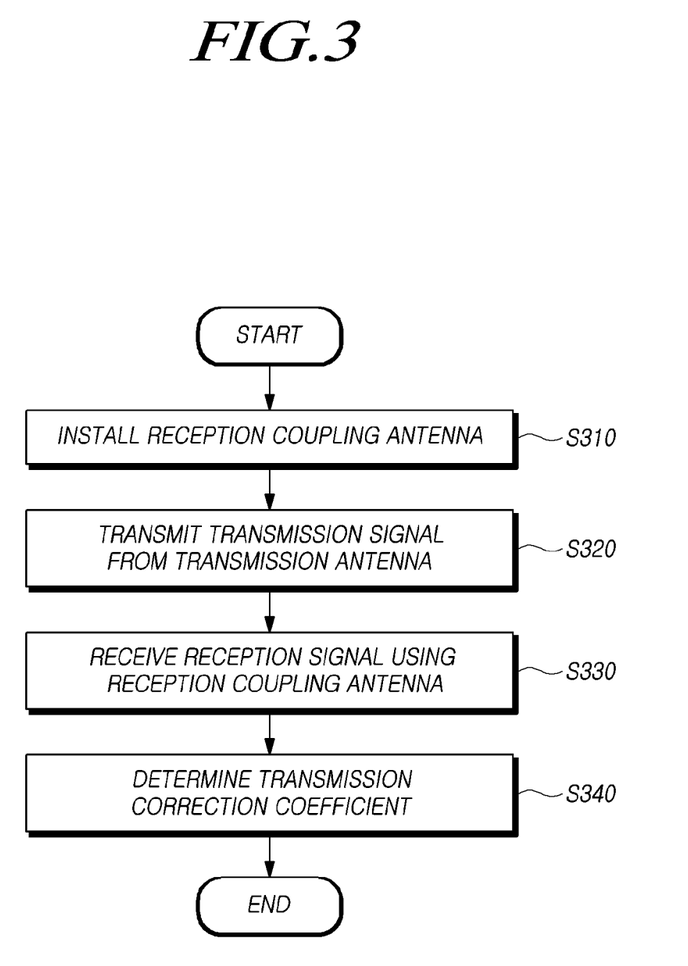
FIG. 3 is a flowchart illustrating an operation of determining a transmission correction coefficient of a radar control apparatus of a vehicle according to an embodiment of the present disclosure.

FIG. 3 is a flowchart illustrating an operation of determining a transmission correction coefficient of a radar control apparatus of a vehicle according to an embodiment of the present disclosure.

Referring to FIG. 3, in the radar control apparatus of a vehicle according to an embodiment of the present disclosure, the reception coupling antenna may be installed for correcting the plurality of transmission antennas (S310). For example, the transmitter/receiver (110) may have a structure in which transmission signals of the same form are simultaneously transmitted through the plurality of transmission antennas or transmission channels, and reception signals reflected on a target are received using one or more reception antennas.

The transmitter/receiver (110) may transmit transmission signals from the plurality of transmission antennas (S320). As one example, the transmitter/receiver (110) may transmit a transmission signal for correcting the antenna from each of the transmission antenna at a period set in advance. At this time, a transmission signal is a signal included in a transmission correction signal and may be transmitted for each transmission antenna or for each transmission channel. For improvement of reception signal quality and acquisition of accurate target angle information, transmission signals may be signals having the same phase. In addition, a transmission signal included in a transmission correction signal is a transmission signal dedicatedly used for correcting a phase and may be a signal different from a transmission signal used for detecting a target. Details of the transmission correction signal will be described below with reference to FIG. 7.

The transmitter/receiver (110) may receive a reception signal using the reception coupling antenna (S330). For example, transmission signals transmitted from the plurality of transmission antenna are reflected on a target, and the reflected reception signals may be received by the transmitter/receiver (110) through the reception coupling antenna.

The signal processor (120) may determine a transmission correction coefficient using transmission signals transmitted from the plurality of transmission antennas and reception signals received by the reception coupling antenna (S340). For example, the signal processor (120) may acquire phases of transmission/reception signals for acquiring information by processing transmission signals and reception signals. Thus, the signal processor (120) may correct minute differences occurring in transmission signals transmitted from the plurality of transmission antennas in accordance with changes in hardware of the radar device using the phases of the transmission/reception signals. As another example, the signal processor (120) may acquire a phase according to an element characteristics change using transmission correction signals transmitted from the plurality of transmission antennas and a reception signal received by the reception coupling antenna. Then, the signal processor (120) may determine a reciprocal of the acquired phase as a transmission correction coefficient. The signal processor (120) acquires a phase for each of the plurality of transmission antennas or for each transmission channel and thus may determine a transmission correction coefficient for each thereof.

Figure 4:
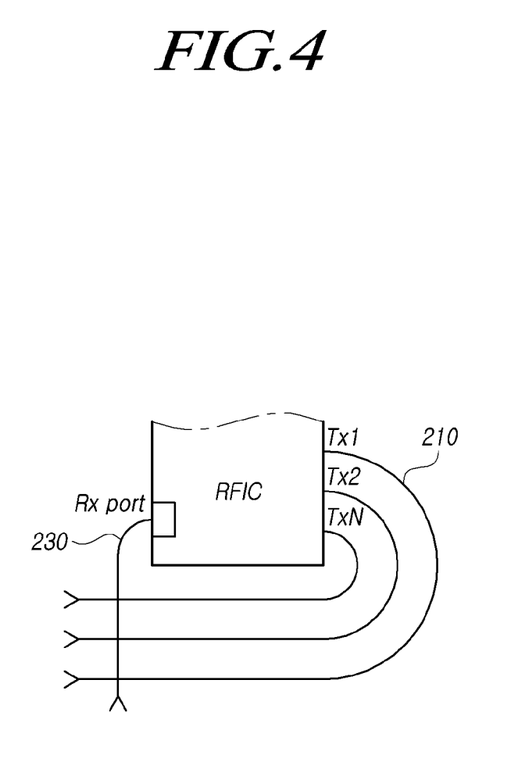
FIG. 4 is a diagram illustrating transmission antenna correction of a radar control apparatus of a vehicle according to an embodiment of the present disclosure.

FIG. 4 is a diagram illustrating transmission antenna correction of a radar control apparatus of a vehicle according to an embodiment of the present disclosure.

Referring to FIG. 4, the radar control apparatus of a vehicle may include a plurality of transmission antennas (210) disposed in a printed circuit board. In addition, the radar control apparatus of a vehicle may include a reception coupling antenna (230) at a position near a plurality of transmission antennas (210) of the printed circuit board. As a specific example, the reception coupling antenna (230) may be installed in a lower layer near a layer in which the plurality of transmission antennas (210) are installed in the printed circuit board.

For example, the reception coupling antenna (230) may be configured to receive transmission correction signals from the plurality of transmission antennas (210). Then, in a reception channel port of the reception coupling antenna (230), a transmission correction coefficient for correcting the transmission antenna may be determined in real time. As a more specific example, the transmitter/receiver (110) may transmit transmission signals from transmission antenna channels Tx1, Tx2, . . . , Tx3 included in the plurality of transmission antennas (210) at a period set in advance. At this time the transmission signal may be a transmission correction signal for transmission correction. Then, the transmitter/receiver (110) may receive transmission signals using the reception coupling antenna (230) and acquire a phase for each transmission channel for transmission correction in a reception channel port of the reception coupling antenna (230). In addition, the signal processor (120) may determine a transmission correction coefficient for each transmission channel corresponding to each transmission channel by determining a reciprocal of the phase for each transmission channel acquired in the reception channel port. The transmission correction coefficient may be represented as in Equation 1.

$$\frac{1}{\Phi_{T \times N_{T \times num}, T \times cal}}$$ [Equation 1]

Here, $\phi_{T \times N_{T \times Num}, T \times Cal}$ may be a phase value acquired based on a transmission signal transmitted in a transmission antenna channel TxN among transmission antenna channels and a reception signal received by the reception coupling antenna. Thus, the transmission correction coefficient may be determined for each channel of the transmission antennas in accordance with each phase value acquired for each channel of the transmission antennas. In other words, if there are N transmission antenna channels, the signal processor (120) may acquire N phases and determine N transmission correction coefficients.

Figure 5:
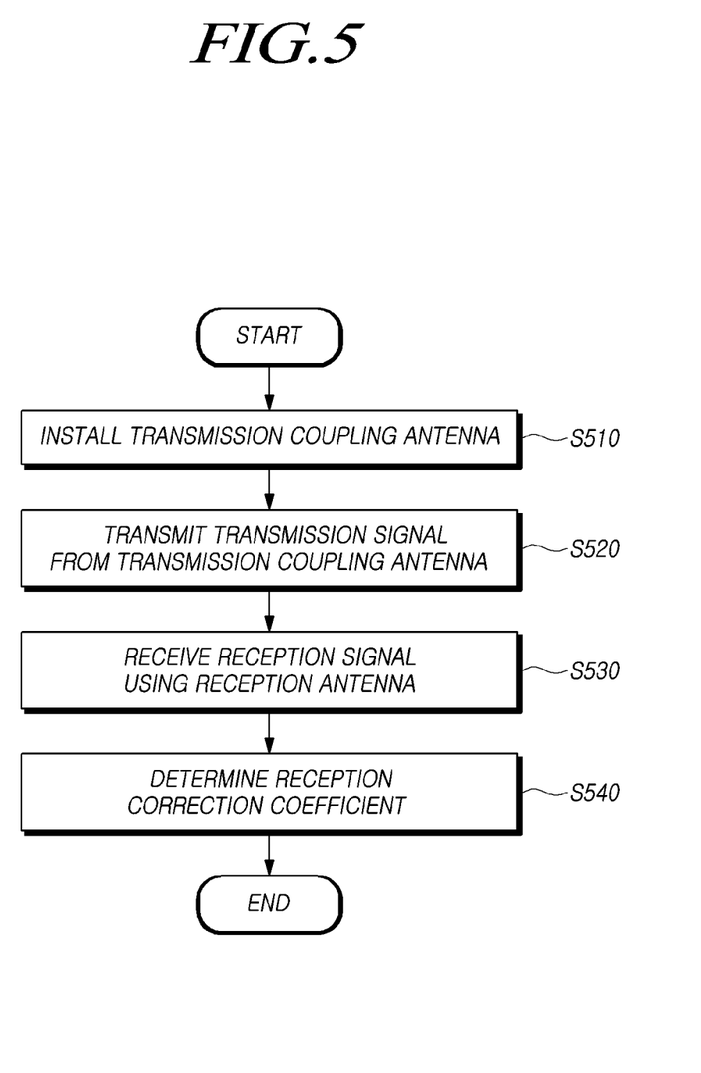
FIG. 5 is a flowchart illustrating an operation of determining a reception correction coefficient of a radar control apparatus of a vehicle according to an embodiment of the present disclosure.

FIG. 5 is a flowchart illustrating an operation of determining a reception correction coefficient of a radar control apparatus of a vehicle according to an embodiment of the present disclosure.

Referring to FIG. 5, in the radar control apparatus of a vehicle according to the embodiment of the present disclosure, a transmission coupling antenna may be installed for correcting a plurality of reception antennas (S510). For example, the transmitter/receiver (110) may have a structure in which a transmission signal is transmitted from the transmission coupling antenna, and reception signals reflected on a target are received through a plurality of reception antennas or reception channels.

The transmitter/receiver (110) may transmit a transmission signal from the transmission coupling antenna (S520). As one example, the transmitter/receiver (110) may transmit a transmission signal used for antenna correction from the transmission coupling antenna at a period set in advance. At this time, the transmission signal is a signal included in a transmission correction signal and may be a signal having a waveform different from the transmission signal transmitted from the transmission antenna that is another signal included in the transmission correction signal. In addition, a transmission signal included in the transmission correction signal is a transmission signal that is dedicatedly used for phase correction and may be a signal different from the transmission signal used for target detection. Details of the transmission correction signal will be described below with reference to FIG. 7.

The transmitter/receiver (110) may receive reception signals using a plurality of reception antennas (S530). For example, a transmission signal transmitted from the transmission coupling antenna is reflected on a target, and the transmitter/receiver (110) may receive a reflected reception signal from a plurality of reception antennas or reception channels.

The signal processor (120) may determine a reception correction coefficient using the transmission signal transmitted from the transmission coupling antenna and the reception signals received by the plurality of reception antennas (S540). For example, the signal processor (120) may acquire phases of transmission/reception signals for acquiring information by processing the transmission signal and the reception signals. Thus, the signal processor (120) may correct minute differences occurring in the reception signals received by the plurality of reception antennas in accordance with hardware changes of the radar device using the phases of the transmission/reception signals. As another example, the signal processor (120) may acquire a phase according to an element characteristic change using a transmission correction signal transmitted from the transmission coupling antenna and reception signals received by the plurality of reception antennas. Then, the signal processor (120) may determine a reciprocal of the acquired phase as a reception correction coefficient. The signal processor (120) may determine each reception correction coefficient by acquiring a phase for each of the plurality of reception antennas or reception channels.

Figure 6:
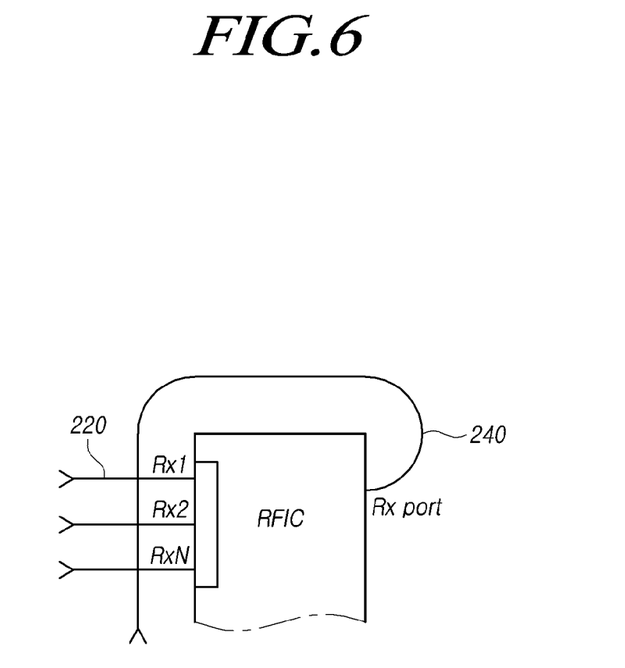
FIG. 6 is a diagram illustrating reception antenna correction of a radar control apparatus of a vehicle according to an embodiment of the present disclosure.

FIG. 6 is a diagram illustrating reception antenna correction of a radar control apparatus of a vehicle according to an embodiment of the present disclosure.

Referring to FIG. 6, the radar control apparatus of a vehicle may include a plurality of reception antennas (220) disposed on a printed circuit board. In addition, the radar control apparatus of a vehicle may include a transmission coupling antenna (240) at a place near the plurality of reception antennas (220) of the printed circuit board. As a more specific example, the transmission coupling antenna (240) may be installed in a lower layer near a layer in which the plurality of reception antennas (220) are installed in the printed circuit board.

For example, the transmission coupling antenna (240) may be configured to transmit transmission correction signals to the plurality of reception antennas (220). Then, a transmission channel port of the transmission coupling antenna (240) may be used for determining a reception correction coefficient used for reception antenna correction in real time. As a more specific example, the transmitter/receiver (110) may receive transmission signals transmitted at a period set in advance using reception antenna channels Rx1, Rx2, . . . , RxN included in the plurality of reception antennas (220). At this time, the transmission signal may be a transmission correction signal used for transmission correction. Then, the transmitter/receiver (110) may acquire a phase for each reception channel used for reception correction by transmitting a transmission signal in a transmission channel port of the transmission coupling antenna (240) and receive signals in reception channels of the plurality of reception antennas (220). In addition, the signal processor (120) may determine a reciprocal of a phase for each reception channel using the transmission channel port and determine a reception correction coefficient for each reception channel corresponding to each reception channel. The reception correction coefficient may be represented as in Equation 2.

$$\frac{1}{\phi_{R \times N_{R \times num}, R \times Cal}}$$ [Equation 2]

Here, $\phi_{R \times N_{R \times Num}, R \times Cal}$ may be a phase value acquired based on a transmission signal transmitted from the transmission coupling antenna and a reception signal received in a reception antenna channel RxN among reception antenna channels. Thus, the reception correction coefficient may be determined for each channel of the reception antennas in accordance with each phase value acquired for each channel of the reception antennas. In other words, if there are N reception antenna channels, the signal processor (120) may acquire N phases and determine N reception correction coefficients.

Figure 7:
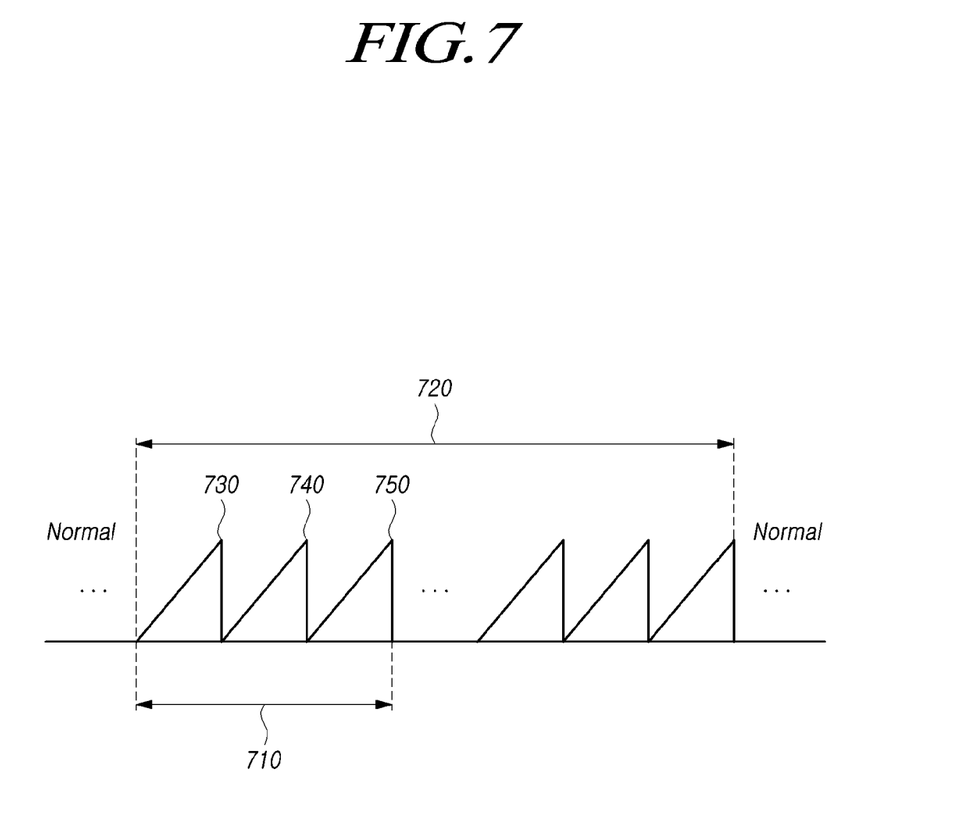
FIG. 7 is a diagram illustrating a transmission correction signal of a radar control apparatus of a vehicle according to an embodiment of the present disclosure.

FIG. 7 is a diagram illustrating a transmission correction signal of a radar control apparatus of a vehicle according to an embodiment of the present disclosure.

Referring to FIG. 7, the transmission correction signal (720) transmitted by the radar control apparatus of the vehicle for performing phase correction in real time can be described. According to one embodiment, the transmitter/receiver (110) may transmit transmission correction signals formed of transmission signals having respective waveforms from a plurality of transmission antennas and a transmission coupling antenna at a period set in advance. Here, the transmission correction signal is a transmission signal dedicatedly used for performing phase correction and may be a signal that is inserted between transmission signals used for target detection with a period set in advance and is transmitted. For example, the transmitter/receiver (110) transmits a transmission correction signal at a (correction) period set in advance, and the correction period may be set in consideration of an overhead in accordance with the performance of a radar device with reference to a signal processing period of the radar device.

In addition, the transmitter/receiver (110) may determine one transmission signal set (710) by combining a transmission signal transmitted from each transmission channel of transmission antennas and a transmission signal transmitted from the transmission coupling antenna. For example, if transmission channels of the transmission antenna are configured by transmission channels Tx1 and Tx2, the transmitter/receiver (110) may determine one transmission signal set (710) by combining a transmission signal (730) of the transmission channel Tx1 and the transmission signal (740) of the transmission channel Tx2 used for correcting the transmission antennas and a transmission signal (750) of the transmission coupling antenna used for correcting the reception antennas. At this time, although the transmitter/receiver (110) may change the order of the transmission signals configuring the transmission signal set (710), each of the transmission signals may be included with the same number of times with reference to a period set in advance. As a more specific example, the transmission signal set may be configured as a combination of transmission signals in the form of a chirp sequence (CS), and each transmission signal in the form of the chirp sequence may be configured by several linear frequency modulated continuous wave (LFMCW) chirp signals. In other words, the transmission signal set may be configured by generating up-chirp signals of which the frequency linearly increases from a start frequency $f_i$ to an end frequency $f_f$ during a sweep time that is a time during of the chirp signal or a sweep repetition period for each transmission channel. At this time, each chirp signal has an individual frequency band BW that is a difference $(f_f - f_i)$ between the end frequency and the start frequency, and the start frequencies of all the chirp signals may be the same as being $f_i$.

Thus, the transmission signal set may be a combination of transmission signals each in the form of the chirp sequence, and the transmission signals may have mutually-different waveforms by differently setting a time duration of a chirp signal and a bandwidth of the chirp signal. However, the transmission signal may be a signal in any one of various forms other than the form of the chirp sequence and is not limited thereto.

According to another embodiment, the transmitter/receiver (110) may transmit transmission correction signals (720) generated by repeating the transmission signal set (710) an arbitrary number of times at a period set in advance. For example, the transmitter/receiver (110) may use one transmission signal set (710) as a transmission correction signal (720) or may use at least two or more repeated transmission signal sets (710) as a transmission correction signal (720). Here, in accordance with use of the transmission correction signal (720) configured using repeated transmission signal sets (710), the transmitter/receiver (110) can acquire a more accurate phase. In such a case, the transmitter/receiver (110) may determine the phase to be an average value of phases acquired in accordance with the number of times of repetition.

Figure 8:
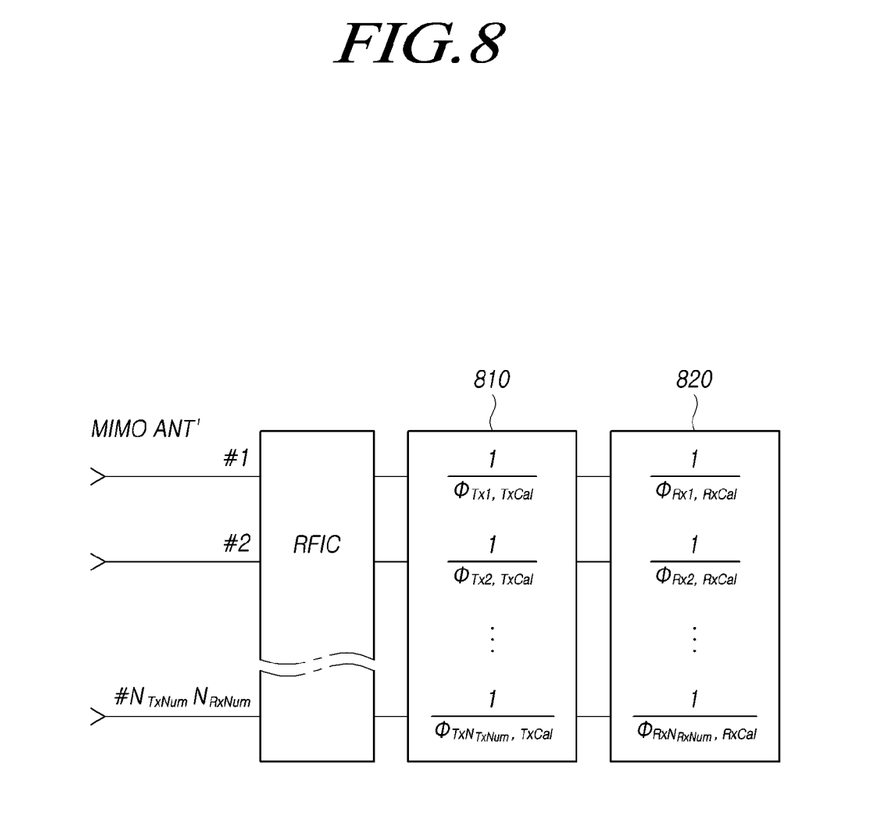
FIG. 8 is a diagram illustrating a correction operation of a radar control apparatus of a vehicle according to an embodiment of the present disclosure.

FIG. 8 is a diagram illustrating a correction operation of a radar control apparatus of a vehicle according to an embodiment of the present disclosure.

Referring to FIG. 8, an operation of the radar control apparatus of the vehicle performing phase correction using a correction coefficient in real time can be described. According to one embodiment, the signal processor (120) may correct a reception signal using a correction coefficient determined by multiplying a transmission correction coefficient (810) with a reception correction coefficient (820) for each channel. For example, in the case of an application to a MIMO antenna, the signal processor (120) may determine a correction coefficient by multiplying a transmission correction coefficient matching a selected channel among a plurality of transmission antennas with a reception correction coefficient matching the selected channel among a plurality of reception antennas. At this time, the transmission correction coefficient may be determined in the form of an N-dimensional column vector that is an N×1 matrix in correspondence with N transmission channels, and the reception correction coefficient may be determined in the form of an N-dimensional row vector that is a 1×N matrix in correspondence with N reception channels. Thus, the correction coefficient may be determined in the form of an N×N matrix by multiplying the transmission correction coefficient by the reception correction coefficient.

According to another embodiment, the signal processor (120) may correct a reception signal received by the reception antenna using the determined correction coefficient. As one example, the signal processor (120) may determine and update a correction coefficient with a period at which the transmission correction signal is transmitted. In addition, the signal processor (120) may perform a function of correcting the phase of a reception signal at a next time point using the determined correction coefficient. For example, the signal processor (120) may determine a correction coefficient using a transmission correction signal transmitted at a first transmission time point and correct a phase of a reception signal received up to a next second transmission time point. Here, the second transmission time point may be a time point after the first transmission time point at which a transmission correction signal is transmitted in accordance with a period set in advance. Accordingly, the radar control apparatus of a vehicle according to this embodiment performs correction using a correction coefficient that is periodically updated and thus can provide an effect of reflecting characteristics of elements changing due to environments and the like in real time.

Hereinafter, a radar control method of a vehicle that can be performed by the radar control apparatus of a vehicle described with reference to FIGS. 1 to 8 will be described.

Figure 9:
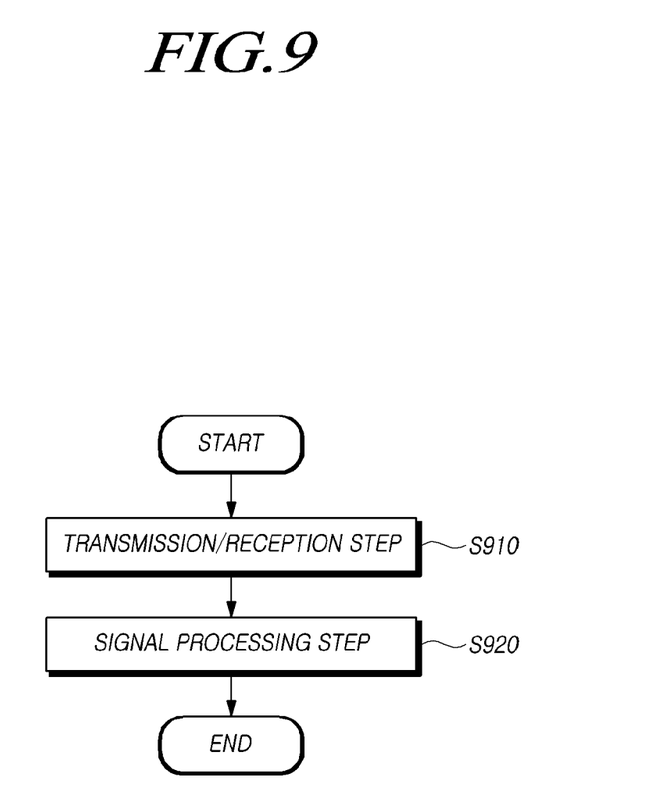
FIG. 9 is a flowchart of a radar control method of a vehicle according to an embodiment of the present disclosure.

FIG. 9 is a flowchart of a radar control method of a vehicle according to an embodiment of the present disclosure.

Referring to FIG. 9, the radar control method of a vehicle according to the present disclosure may include a transmission/reception step of transmitting and receiving transmission signals having respective waveforms (S910). According to one embodiment, the radar control apparatus of the vehicle may transmit transmission signals having respective waveforms from a plurality of transmission antennas and a transmission coupling antenna at a period set in advance and receive the transmission signals using a reception coupling antenna and a plurality of reception antennas. Here, the reception coupling antenna may be an antenna that is additionally connected for correcting the plurality of transmission antennas, and the transmission coupling antenna may be an antenna that is additionally connected for correcting the plurality of reception antennas.

As one example, the radar control apparatus of the vehicle may receive transmission signals transmitted from transmission channels of the transmission antennas using the reception coupling antenna connected to the transmission antennas. For example, the radar control apparatus of the vehicle may transmit transmission signals from A transmission antennas and receive the transmission signals through one reception coupling antenna connected to the A transmission antennas.

As another example, the radar control apparatus of the vehicle may receive transmission signals transmitted from the transmission coupling antenna connected to the reception antennas in reception channels of the reception antennas. For example, the radar control apparatus of the vehicle may transmit a transmission signal from one transmission coupling antenna connected to B reception antennas and receive the transmission signal through the B reception antennas. At this time, the transmission signal is a signal output from one transmission coupling antenna and may be received to be the same by the B reception antennas. Here, A and B may be natural numbers. In addition, the radar control apparatus of the vehicle may transmit transmission signals transmitted from a plurality of transmission antennas as transmission signals of the same waveform or transmission signals of different waveforms. Here, transmission signals transmitted from the plurality of transmission antennas and a transmission signal transmitted from the transmission coupling antenna need to be distinguished from each other, and thus the radar control apparatus of the vehicle may transmit the transmission signals as transmission signals of mutually-different waveforms.

As another embodiment, the radar control apparatus of the vehicle may transmit transmission correction signals based on a transmission signal set. As one example, the radar control apparatus of the vehicle may determine transmission signals transmitted from transmission channels of the transmission antennas and a transmission signal transmitted from the transmission coupling antenna as one transmission signal set. For example, the radar control apparatus of the vehicle may output transmission signals having mutually-different waveforms one for each transmission channel of the transmission antenna and output one transmission signal transmitted from the transmission coupling antenna. Then, the radar control apparatus of the vehicle may determine one transmission signal set acquired by combining transmission signals corresponding to the number of transmission antennas and one transmission signal generated from the transmission coupling antenna. More specifically, the transmission signal set may be composed of transmission signals in the form of a chirp sequence (CS), and transmission signals in the form of the chirp sequence may be configured as several linear frequency modulated continuous wave (LFMCW) chirp signals. Thus, the transmission signal set may be a combination of transmission signals each being in the form of a chirp sequence, or transmission signals may be mutually-different waveforms by differently setting time durations of chirp signals and bandwidths of the chirp signals. Here, the transmission signal may be signal in various forms other than the chirp sequence forms and are not limited thereto.

As another example, the radar control apparatus of the vehicle may transmit a transmission correction signal based on the determined transmission signal set. For example, the radar control apparatus of the vehicle may transmit a transmission correction signal generated by repeating the determined transmission signal set an arbitrary number of times for each period. As a more specific example, the radar control apparatus of the vehicle may transmit a transmission correction signal with a specific period for correcting a phase based on a signal processing period of the radar device. At this time, the transmission correction signal may be one transmission signal set or may be a signal in which the transmission signal set is repeated an arbitrary number of times. In such a case, the phase may be determined to be an average value of phases acquired in accordance with an arbitrary number of times of repetition according to the transmission correction signal. Thus, by configuring the transmission correction signal in which the transmission signal set is repeated, the radar control apparatus of the vehicle can acquire a more accurate phase. Here, the transmission correction signal may be a signal different from a transmission signal used for detecting a target by a radar as a transmission signal dedicatedly used for correcting a phase of a reception signal.

The radar control method of a vehicle may further include a signal processing step of correcting reception signals (S920). According one embodiment, the radar control apparatus of the vehicle may determine information (a position, a distance, an angle, and the like) of a target using a reflection signal and a transmission signal received by a reception antenna. In addition, the radar control apparatus of the vehicle may acquire a minute difference occurring in the phase of a transmission signal in a transmission channel or the phase of a reception signal in a reception channel in accordance with a dynamic environment change using the transmission correction signal.

According to another embodiment, the radar control apparatus of the vehicle may determine a correction coefficient based on a phase acquired from a signal received in accordance with transmission of a transmission correction signal. As one example, the radar control apparatus of the vehicle may acquire a phase for each transmission channel in a reception channel port of the reception coupling antenna and determine a reciprocal of the acquired phase as a transmission correction coefficient. For example, the radar control apparatus of the vehicle may acquire a phase corresponding to each transmission antenna based on a transmission signal transmitted in a transmission channel of each transmission antenna at a first transmission time point and a reception signal received in a reception channel port of the reception coupling antenna. In addition, the radar control apparatus of the vehicle may determine a reciprocal of the acquired phase for each transmission channel of each transmission antenna as a transmission correction coefficient for each transmission channel of each transmission antenna.

As another example, the radar control apparatus of the vehicle may acquire a phase for each reception channel from the reception antenna using the transmission channel port of the transmission coupling antenna and determine a reciprocal of the acquired phase as a transmission correction coefficient. For example, the radar control apparatus of the vehicle may acquire a phase corresponding to each reception antenna based on a transmission signal transmitted in the transmission channel port of the transmission coupling antenna at a first transmission time point and a reception signal received in the reception channel of each reception antenna. In addition, the radar control apparatus of the vehicle may determine a reciprocal of the acquired phase for each reception channel of each reception antenna as a reception correction coefficient for each reception channel of each reception antenna.

According to another embodiment, the radar control apparatus of the vehicle may correct a reception signal received by the reception antenna using the determined correction coefficient. As one example, the radar control apparatus of the vehicle may determine a correction coefficient by multiplying a transmission correction coefficient by a reception correction coefficient and update the correction coefficient based on a period set in advance. In addition, the radar control apparatus of the vehicle may perform a function of correcting a phase of a reception signal at a next time point using the determined correction coefficient. For example, the radar control apparatus of the vehicle may correct a phase of a reception signal until a following second transmission time point using the determined correction coefficient. Here, the second transmission time point is a time point at which a transmission correction signal is transmitted after the first transmission time point, and an interval between the first transmission time point and the second transmission time point may be a period set in advance.

As described above, according to the present disclosure, an apparatus and a method for controlling a radar in a vehicle that correct a reception signal using a correction coefficient that is periodically determined can be provided. Particularly, by determining a transmission correction coefficient using a reception coupling antenna for correcting transmission antennas, determining a reception correction coefficient by using a transmission coupling antenna for correcting reception antennas, and applying the determined correction coefficients, an apparatus and a method for controlling a radar in a vehicle that correct a reception signal using a correction coefficient in which characteristic changes in elements are reflected can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control apparatus of a vehicle, comprising:
 a transmitter/receiver that transmits transmission signals having respective waveforms from a plurality of transmission antennas and a transmission coupling antenna at a period set in advance and receives the transmission signals using a reception coupling antenna and a plurality of reception antennas; and
 a signal processor that determines a correction coefficient based on phases acquired from received signals and corrects reception signals received by the reception antennas using the correction coefficient, wherein the signal processor determines the correction coefficient by multiplying a transmission correction coefficient by a reception correction coefficient, wherein the signal processor acquires a phase for each transmission channel in a reception channel port of the reception coupling antenna and determines a reciprocal of the phase for each transmission channel as the transmission correction coefficient.

2. The radar control apparatus of the vehicle according to claim 1, wherein the transmitter/receiver receives the transmission signals transmitted from transmission channels of the transmission antennas using the reception coupling antenna connected to the transmission antennas and receives the transmission signal transmitted from the transmission coupling antenna connected to the reception antennas in reception channels of the reception antennas.

3. The radar control apparatus of the vehicle according to claim 1, wherein the transmitter/receiver determines the transmission signal transmitted from each of transmission channels of the transmission antennas and the transmission signal transmitted from the transmission coupling antenna as one transmission signal set and transmits a transmission correction signal based on the transmission signal set.

4. The radar control apparatus of the vehicle according to claim 3, wherein the transmitter/receiver generates the transmission correction signal by repeating the transmission signal set an arbitrary number of times for each period.

5. The radar control apparatus of the vehicle according to claim 1, wherein the signal processor updates the correction coefficient based on the period.

6. The radar control apparatus of the vehicle according to claim 1, wherein the signal processor acquires a phase for each reception channel using the reception antenna using a transmission channel port of the transmission coupling antenna and determines a reciprocal of the phase for each reception channel as the reception correction coefficient.

7. A radar control method of a vehicle comprising:
  transmitting transmission signals having respective waveforms from a plurality of transmission antennas and a transmission coupling antenna at a period set in advance and receiving the transmission signals using a reception coupling antenna and a plurality of reception antennas; and
  determining a correction coefficient based on phases acquired from received signals and correcting reception signals received by the reception antennas using the correction wherein, in the determining of the correction coefficient and the correcting of the reception signals:
  the correction coefficient is determined by multiplying a transmission correction coefficient by a reception correction coefficient; and
  a phase for each transmission channel is acquired in a reception channel port of the reception coupling antenna, and a reciprocal of the phase for each transmission channel is determined as the transmission correction coefficient.

8. The radar control method of a vehicle according to claim 7, wherein, in the transmitting of the transmission signals and the receiving of the transmission signals, the transmission signals transmitted from transmission channels of the transmission antennas are received using the reception coupling antenna connected to the transmission antennas, and the transmission signal transmitted from the transmission coupling antenna connected to the reception antennas is received in reception channels of the reception antennas.

9. The radar control method of a vehicle according to claim 7, wherein, in the transmitting of the transmission signals and the receiving of the transmission signals, the transmission signal transmitted from each of transmission channels of the transmission antennas and the transmission signal transmitted from the transmission coupling antenna are determined as one transmission signal set, and a transmission correction signal is transmitted based on the transmission signal set.

10. The radar control method of a vehicle according to claim 9, wherein, in the transmitting of the transmission signals and the receiving of the transmission signals, the transmission correction signal is generated by repeating the transmission signal set an arbitrary number of times for each period.

11. The radar control method of a vehicle according to claim 7, wherein, in the determining of a correction coefficient and the correcting of the reception signals, the correction coefficient is updated based on the period.

12. The radar control method of a vehicle according to claim 7, wherein, in the determining of the correction coefficient and the correcting of the reception signals, a phase for each reception channel is acquired using the reception antenna using a transmission channel port of the transmission coupling antenna, and a reciprocal of the phase for each reception channel is determined as the reception correction coefficient.

* * * * *